United States Patent [19]

Inman

[11] 4,287,959

[45] Sep. 8, 1981

[54] SELF PROPELLED PALLET TRUCK

[76] Inventor: Richard Inman, 3905 Green Industrial Way, Atlanta, Ga. 30341

[21] Appl. No.: 14,900

[22] Filed: Feb. 23, 1979

Related U.S. Application Data

[62] Division of Ser. No. 901,099, Apr. 28, 1978, abandoned.

[51] Int. Cl.³ .............................................. B62D 1/14
[52] U.S. Cl. .................... 180/12; 180/19 H; 180/65 R; 280/43.12; 280/109; 318/349; 338/153
[58] Field of Search ............... 180/12, 13, 19 R, 19 S, 180/19 H, 65 R; 280/43.12, 109, 111; 338/108, 153; 318/349

[56] References Cited

U.S. PATENT DOCUMENTS

| | | | |
|---|---|---|---|
| 1,194,780 | 8/1916 | Pavey et al. | 280/109 X |
| 2,359,493 | 10/1944 | Schreck | 180/13 X |
| 2,379,774 | 7/1945 | Wyer | 338/153 |
| 2,534,939 | 12/1950 | Alkire | 338/153 |
| 2,942,679 | 6/1960 | Gibson | 180/65 R X |
| 2,986,953 | 6/1961 | Armond et al. | 338/153 X |
| 3,181,640 | 5/1965 | Goodacre et al. | 180/19 R |
| 3,300,612 | 1/1967 | Quayle | 180/19 H |
| 3,419,104 | 12/1968 | Messenger | 180/19 R X |
| 3,833,782 | 9/1974 | Bartel | 338/153 X |

Primary Examiner—Joseph F. Peters, Jr.
Assistant Examiner—Michael Mar
Attorney, Agent, or Firm—Cushman, Darby & Cushman

[57] ABSTRACT

A pallet truck for lifting and transporting pallets. The truck is moved by a self-propelled carriage having two wheels. Each wheel is propelled by a separate direct current electric motor, the motors being wired in series, so as to automatically adjust the speed of the respective wheels during turning.

6 Claims, 7 Drawing Figures

SELF PROPELLED PALLET TRUCK

This is a division of application Ser. No. 901,099, filed Apr. 28, 1978, now abandoned.

The present invention relates to a self-propelled pallet truck of the type used to lift and transport a pallet.

BACKGROUND OF THE INVENTION

It is common practice in warehousing and shipping goods to support them on pallets. Typically, a pallet is a wooded platform having a horizontal plate, often made of spaced boards, and parallel upright boards on which the plate rests. The upright beams traverse the respective sides of the plate, and a third beam may traverse the plate midway between the other two. The plate is secured to the upper edges of the beams. Thus a pallet constitutes a platform, a few inches high, with an open space under the platform.

Machinery is used to lift pallets and move them about. The machinery commonly used comprises a fork, having a pair of long arms which are moved under the plate of a pallet and then lifted to elevate the pallet. The machinery also comprises wheels, and often propulsion means so that the machinery and the pallet may be moved to another location where the pallet is lowered. Large machinery of this type is generally call a fork-lift truck. Smaller machinery of this type is usually called a pallet truck. Fork-lift trucks are distinguished from pallet trucks by providing a seat on which the operator rides, whereas a pallet truck is designed for an operator who walks along behind the truck. Pallet trucks may be designed to be pulled or pushed about by the operator, or to be self-propelled.

SUMMARY OF THE INVENTION

The present invention provides improvements in a self-propelled pallet truck which improves its stability as it moves about. In particular, these improvements are provided by using a pair of spaced apart drive wheels which are independently operated by electric motors which automatically adjust the speed of rotation of the respective drive wheels during turning movements, to provide the effect of differential drive by electric means. Means also are provided to adjust the position of the axle to accommodate uneven floors, and to keep both drive wheels on the floor during turning.

BRIEF DESCRIPTION OF FIGURES OF THE DRAWING

A preferred embodiment of the pallet truck of the invention is illustrated in the drawings in which.

DESCRIPTION OF PREFERRED EMBODIMENT

Figure 1:
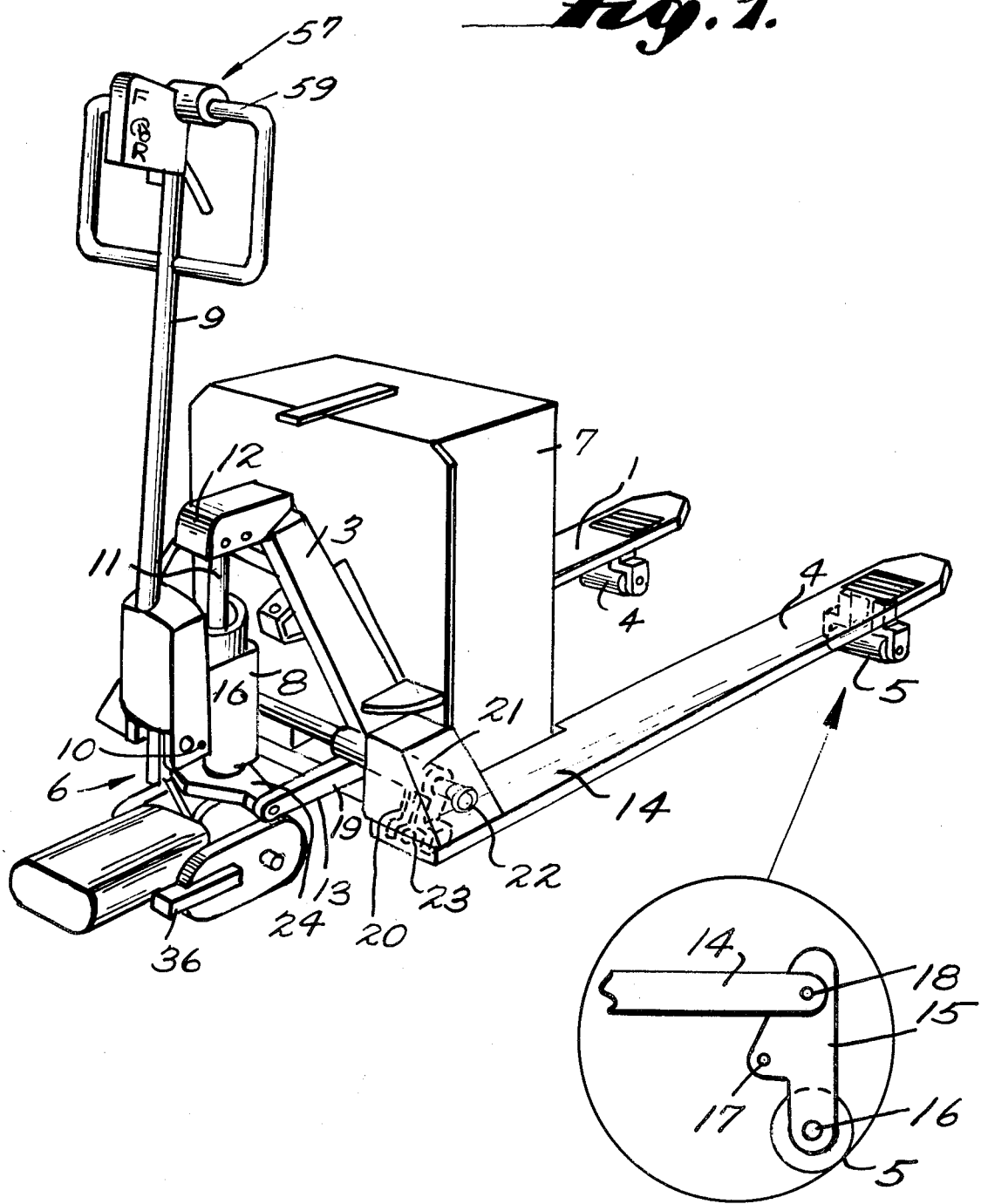
FIG. 1 is a perspective view of the pallet truck.

The pallet truck of the present invention as illustrated in FIG. 1, comprises a pair of arms 1 and 2 joined by a yoke 3 which supports a pallet when the truck is used. Wheels 4 and 5 are provided under the forward ends of the respective arms 1 and 2, and the yoke 3 is supported by a self-propelled carriage, indicated generally at 6. Means, to be described below, are provided for pivotal motion between the carriage 6 and the yoke 3, so that the pallet truck can turn corners. A power supply and control box 7 is mounted on the rear of the arms 1 and 2, adjacent the yoke 3.

For the purpose of lifting the arms 1 and 2 to elevate a pallet, there is a hydraulic jack 8 mounted on the carriage 6. It is actuated manually be a control handle 9 which is raised and lowered around a pivotal connection 10 to pump the hydraulic jack in conventional manner. This results in lifting a piston rod 11 which supports a rearwardly extending bonnet 12 at the top of the yoke 3. There is a ball joint connection between the top of the piston rod 11 and the bonnet 12 which allows the carriage 6 to rotate forward and rearward relative to the yoke as the yoke moves up and down.

Means also are provided to raise the forward ends of the arms 1 and 2 in synchronism with the lifting of the bonnet 12, so that the arms 1 and 2 remain substantially parallel to the floor. The parallel motion mechanism which achieves this function comprises a bell crank 13, a connecting rod 14 and a fork 15 in which the axle 16 of wheel 5 is journalled. The fork 15 is pivotally connected to the arm 2 by a fork pin 17. In the lowest position of arm 2, the fork 15 is tilted forward. To lift the arm 2, the wheel 5 is moved rearward under fork pin 17 by rotating fork 15 around fork pin 17.

To accomplish this motion, connecting rod 14 is pivotally connected to fork 15 by a pin 18 above fork pin 17, so that forward motion of the connecting rod initiates rearward movement of wheel 5.

The bell crank 13 is a single casting comprising a horizontal leg 19, and a vertical leg 20 joined by a cylindrical bearing 21. The bearing 21 is journalled on a horizontal shaft 22 whose ends are secured to the opposite legs of the yoke 3. The lower end of leg 20 is connected by a hinge 23 to the rear end of connecting rod 14. Therefore forward and rearward motion of the connecting rod 14 is accomplished by rotation of the bell crank 13 relative to the yoke 3.

The rear end of leg 19 of the bell crank 13 is pivotally connected to a bracket 24 which is mounted below the hydraulic jack 8. Therefore, raising piston rod 11 causes rotation of the bell crank which in turn raises the forward end of arm 2.

A similar mechanism is provided to raise the forward end of arm 1.

A lever 25 is mounted near the top of the control handle 9 which is connected by linkages (not shown) to the hydraulic jack 8. It is raised to release the jack and lower the arms 1 and 2.

Figure 2:
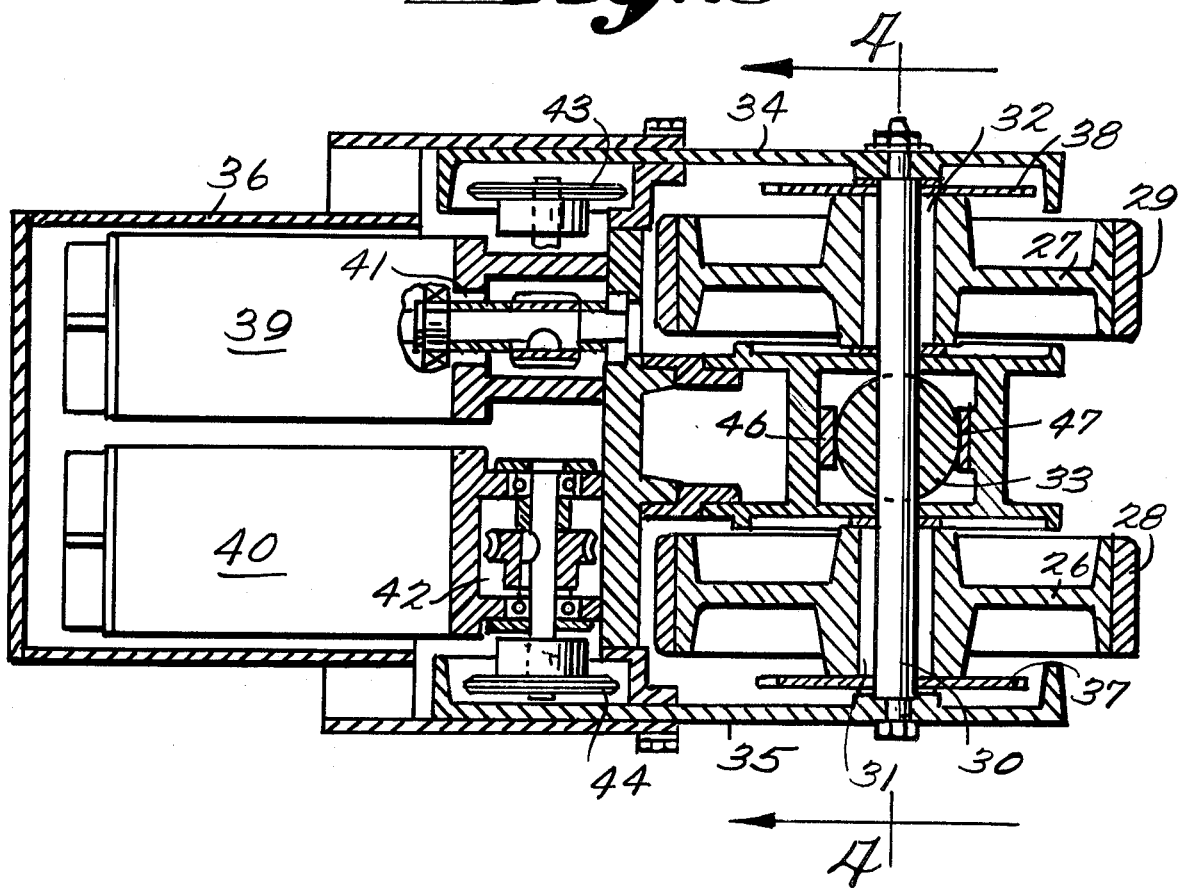
FIG. 2 is a horizontal section through the self-propelled carriage of the pallet truck of FIG. 1.

Referring to FIG. 2, the self-propelled carriage 6 comprises two wheels 26 and 27 covered with urethane rubber tires 28 and 29. The wheels are mounted on an axle 30 by bearings 31 and 32. The axle 30 passes through a large diameter post 33 which depends from hydraulic jack 8, and its ends are bolted to wheel covers 34 and 35 which are bolted to the motor housing 36. The wheels 26 and 27 carry welded-on sprocket wheels 37 and 38 respectively.

Power for the wheels 26 and 27 is provided by two permanent magnet direct current electric motors 39 and 40 which are mounted side-by-side at the rear of the housing 36 with their respective shafts facing forward. Their shafts are coupled to the worms of worm-gear drives 41 and 42 respectively. In FIG. 2, the cross-section has been taken to illustrate the worm of worm-gear drive 41 and the gear of worm-gear drive 42, but it will be understood that the units are identical. The output shafts of the worm-gear drives are coupled to sprocket wheels 43 and 44 which are connected by sprocket chains (not shown) to sprocket wheels 38 and 37 respectively. Therefore operation of D.C. motors 39 and 40 drives wheels 26 and 27 via the worm-gear drives and the sprocket wheels and chain just described.

Figure 4:
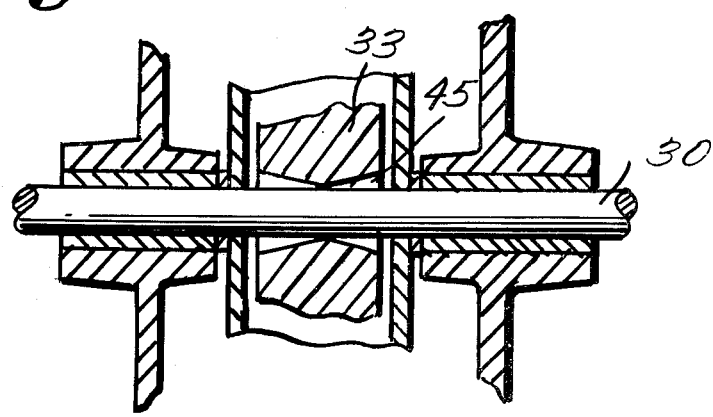
FIG. 4 is a vertical cross-section through part of the self-propelled carriage of FIG. 2.
Figure 3:
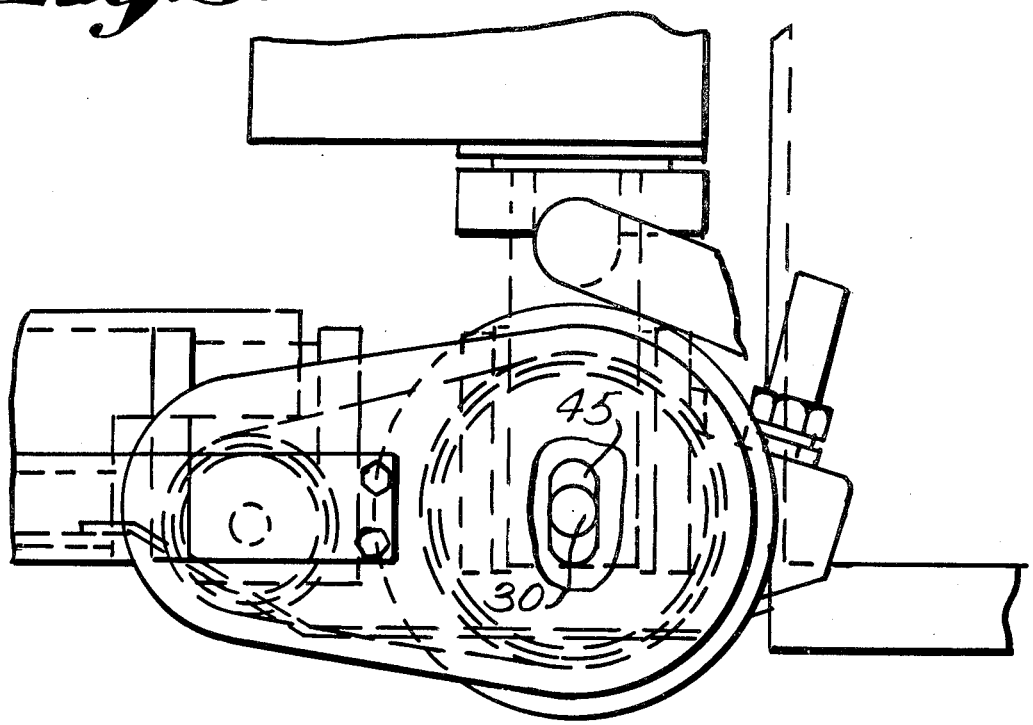
FIG. 3 is a side elevation of a part of the pallet truck of FIG. 1.

A feature of the present invention is provision for the axle 30 to tilt from side to side to prevent one of the wheels 26 and 27 from being lifted from the floor, when the pallet truck is turning a corner and when it traverses an uneven floor. The means for accomplishing this can be seen in FIGS. 2, 3 and 4 which show cross-sections through the axle and the post 33 and an end view of the axle. The bore 45 through the post 33 has been milled so that its ends have parallel sides and semi-circular ends and so that it tapers from both ends towards a circular bore at the mid-point of post 33. The diameter at the mid-point accommodates the diameter of the axle 30 and is the same as the diameter of the semi-circular and lower edges at the outer ends of bore 45. Consequently, the axle can move up and down within the confines of the bore, but is restrained against motion in other directions.

Since the axle 30 is bolted to the wheel covers 34 and 35, which in turn are bolted to the motor housing 36 and the rest of the carriage housing illustrated in FIG. 2, it is necessary to allow the housing to pivot relative to the post 33 in conformity with the above-described rocking motion of the axle. To accommodate such pivotal motion, while securing the carriage housing to post 33, wear plates 46 and 47 are pressed between the carriage housing and the post as seen in FIG. 2.

The post 33 is secured to the base of the hydraulic jack 8 and is rotatable relative to the bracket 24. Therefore, when the control handle 9 is turned, the self-propelled carriage and hydraulic jack are turned relative to the yoke 3 and arms 1 and 2. The necessary pivotal connections are provided by the rotatable connection between bracket 24 and post 33, and the ball joint connection between piston rod 11 and bonnet 12.

Figure 5:
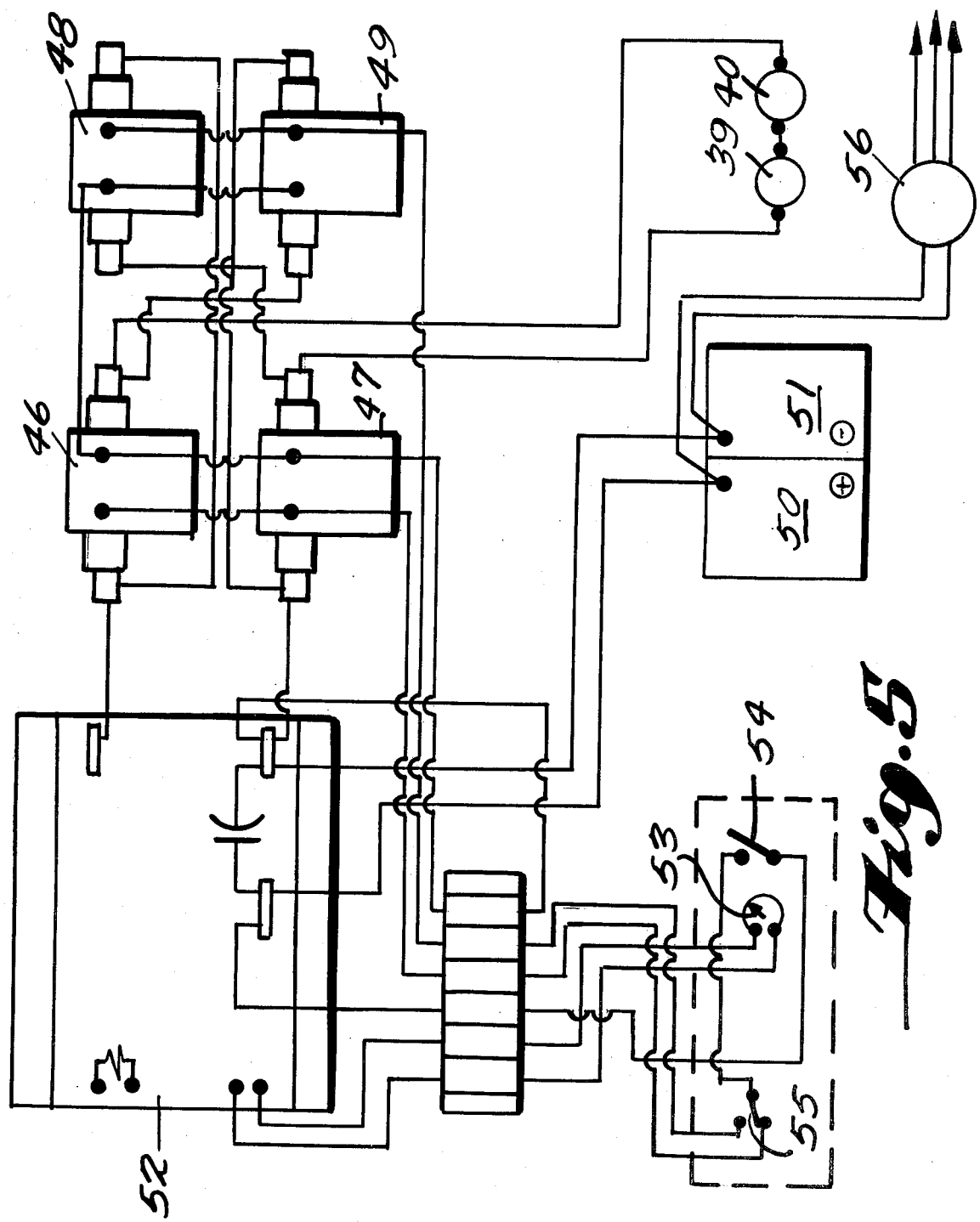
FIG. 5 is a schematic diagram of electrical components of the pallet truck.

The electrical wiring for the pallet truck is illustrated schematically in FIG. 5. Motors 39 and 40 are shown connected in series to a supply of D.C. power through relays 46, 47, 48 and 49. Relays 46 and 47 are actuated for forward motion of the pallet truck and relays 48 and 49 are actuated for reverse motion. Separate relays were selected instead of double throw relays because of chattering difficulties encountered with the latter.

Power for the motors is supplied by 24 volt batteries 50 and 51 through a resistance controlled speed control 52. The speed is in turn controlled by a potentiometer 53 connected to speed control 52. There is a safety microswitch 54 connected so that the motors will not be powered until the safety switch is closed. Forward or reverse motion is selected by double throw switch 55 which actuates relays 46 and 47 or relays 48 and 49. Switch 55 is connected to safety microswitch 54, so that the relays are not actuated until microswitch 54 is closed. A battery charger 56 is provided for recharging the batteries 50 and 51.

Figure 6:
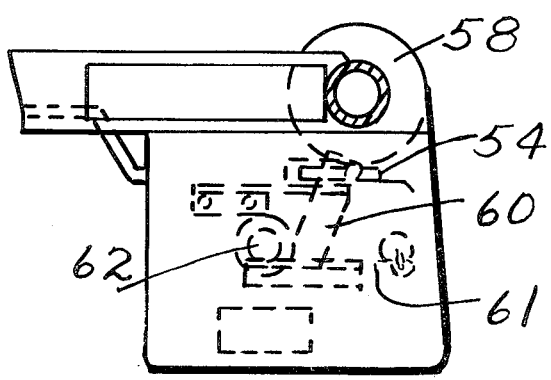
FIG. 6 is a side elevation of the control box which operates the self-propelled carriage.
Figure 7:
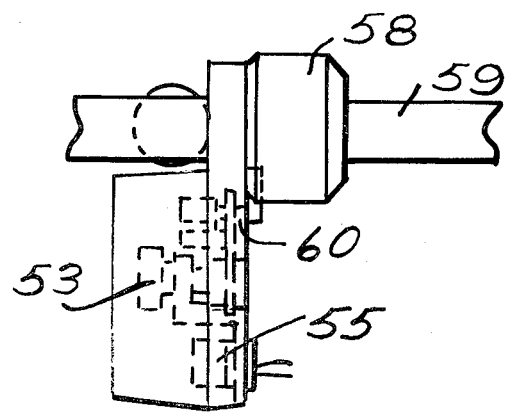
FIG. 7 is a rear elevation of the control box of FIG. 6.

The means for controlling the speed control 52 is illustrated in FIGS. 1, 6 and 7. A control box, indicated generally at 57, is mounted at the top of the control handle 9. It includes forward-reverse switch 55 and a speed control knob 58. There is a cross-piece 59 extending transversely across the top of the control handle 9 and the knob is mounted around the cross-piece for rotation. The knob is turned in a forward direction (clockwise as seen in FIG. 1) to increase the speed of motors 39 and 40. The knob is keyed to permit rotation through an angle of about 30°. The knob 58 carries a depending offset switch lever 60 which is moved forward and back as the knob is turned around the cross-piece 59. As seen in FIG. 6, microswitch 54 is mounted adjacent lever 60 and is actuated as soon as lever 60 is moved by the operator to move the pallet truck.

A rack 61 is provided which is mounted for horizontal sliding movement near the bottom of lever 60, which it engages. The rack 61 is moved forward and back as lever 60 is moved by turning knob 58. Potentiometer 53 is mounted alongside the rack, and pinion 62 is mounted on its shaft. Pinion 62 engages rack 61 and therefore is turned as knob 58 is turned by the operator, thereby increasing and decreasing the speed of the motors 39 and 40.

As a safety measure a spring is provided at one end of the rack which urges lever 60 in a direction which disengages microswitch 54. Therefore, if the operator releases knob 58, the microswitch is disengaged and the pallet truck is stopped.

The invention provides several advantageous electrical and mechanical features. Thus, by means of the series connection of D.C. motors 39 and 40, the motors are allowed to operate at speeds which are regulated by the loads on the wheels 26 and 27. Therefore, as the truck turns a corner, which requires the respective wheels to travel at different speeds, the series connected motors automatically are regulated to the correct speed. The invention thereby provides the effect of differential gearing by electric means.

The mounting of axle 30 stabilizes the pallet truck in an important way. It will be observed that, as the pallet truck is elevated, the bell crank 13 is rotated to move horizontal leg 19 to a more nearly horizontal position. This slightly increases the horizontal distance between the yoke 3 and the self-propelled carriage 6. As a result, the carriage is moved rearward relative to the ball joint under bonnet 12. This motion tends to make the truck unstable, when it turns corners. However, the rocking motion of the axle 30 assures that both wheels will remain on the floor, and therefore eliminates this potential instability.

It will be appreciated that various changes may be made in details of construction and mode of operation without departing from the invention. Therefore, while preferred features have been described, no limitation thereto is intended.

What is claimed is:

1. In a pallet truck comprising means for supporting a pallet, wheels rotatably mounted on said supporting means, a drive carriage including at least two rotatably mounted wheels and means connecting said drive carriage to said supporting means, said pallet truck being supported on the wheels of said supporting means and the wheels of said drive carriage, and said wheels rotating as said pallet truck is moved;

the improvement wherein said connecting means comprises a gimbal between said drive carriage and said supporting means, whereby the wheels of said drive carriage remain in contact with the floor as said pallet truck turns corners and as it moves across uneven floors, said pallet truck including drive means comprising an electric motor operatively connected to the wheels of said carriage, to propel said pallet truck, said pallet truck including a handle and switch means on said handle for actuating said drive means to propel said pallet truck, said switch means including a rotatable collar, spring means operatively connected to said rotatable collar, and a potentiometer mounted in said handle, said spring means urging said rotatable collar in a direction which stops said drive means from propelling said pallet truck, said switch means also including a lever connected to said rotatable collar, a rack and a pinion mounted to rotate the shaft of said potentiometer to control the speed of said drive means, said lever engaging said rack and said rack engaging said pinion to rotate said pinion when said rotatable collar is rotated, whereby the speed of said truck is controlled.

2. In a pallet truck as set forth in claim 1, the further improvement wherein said gimbal connecting means comprises a first shaft, means mounting said drive carriage or rotation around the axis of said first shaft, a second shaft, means mounting said second shaft on said drive carriage so that its axis is substantially perpendicular to said first shaft, said drive carriage being rotatable around the axis of said second shaft, and said last mentioned means permitting pivotal motion of said second shaft relative to said first shaft.

3. In a pallet truck as set forth in claim 2, the further improvement wherein said second shaft is an axle on which the wheels of the drive carriage are mounted.

4. In a pallet truck as set forth in claim 3, the further improvement wherein said first shaft is vertical and has a transverse bore, said second shaft passing through said bore, and the ends of said transverse bore being enlarged to permit a vertical rocking motion of said second shaft.

5. A pallet truck as set forth in claim 4 including drive means operatively connected to the wheels of said drive carriage, to propel said pallet truck.

6. A pallet truck comprising means for supporting a pallet, wheels rotatably mounted on said supporting means so that said pallet truck can be transported, drive means including an electric motor operatively connected to at least one of said wheels to propel said pallet truck, a handle, and switch means on said handle for actuating said drive means, said switch means including a rotatable collar, spring means operatively connected to said rotatable collar and a potentiometer mounted in said handle, said spring means urging said rotatable collar in a direction which stops said drive means from propelling said pallet truck, said switch means also including a lever connected to said rotatable collar a rack and a pinion mounted to rotate the shaft of said potentiometer to control the speed of said drive means, said lever engaging said rack and said rack engaging said pinion to rotate said pinion when said rotatable collar is rotated whereby the speed of said truck is controlled.

* * * * *